Sept. 19, 1933.  G. GEARY  1,927,516
LUG FOR TRACTION WHEELS
Filed Oct. 7, 1931
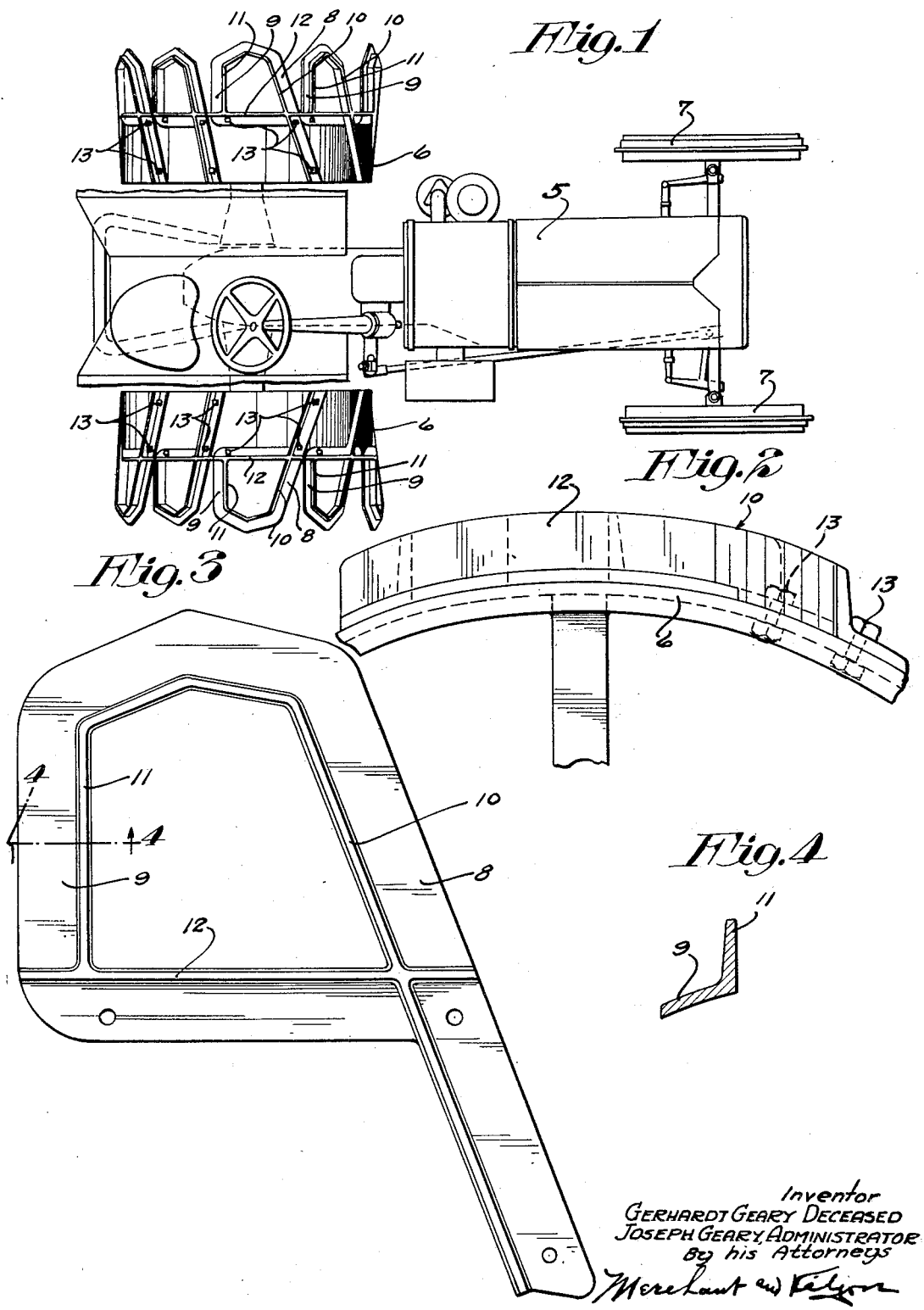

Patented Sept. 19, 1933

1,927,516

UNITED STATES PATENT OFFICE 1,927,516

LUG FOR TRACTION WHEELS

Gerhardt Geary, deceased, late of Bergen, Wis., by Joseph Geary, administrator, Bergen, Wis.

Application October 7, 1931. Serial No. 567,457

1 Claim. (Cl. 301—44)

This invention provides an extremely simple and highly efficient traction lug for traction wheels and especially for the traction wheels of tractors that are required to work in soft ground. Generally stated, the invention consists of the novel devices, combinations of devices, construction and arrangement of parts hereinafter described and defined in the claim.

The improved traction lug of this invention is much the form of a figure 9 that is, it has a substantially straight stem and a looped end, the said parts being flanged and so relatively arranged on the wheel that the loops of the lugs will project beyond the face of the wheel and certain flanges of adjacent lugs will afford a continuous bearing circumferentially of the wheel that will prevent the traction lugs from cutting into a well packed roadbed to such an extent as to do any considerable damage thereto. The projecting loop portions of the lug give the traction wheel very great tractive grip on soft ground.

In the accompanying drawing, which illustrates the invention, like characters indicate like parts throughout the serval views.

Referring to the drawing:

Fig. 1 is a plan view showing a tractor, the traction wheels of which are equipped with the improved traction lugs;

Fig. 2 is a fragmentary view in side elevation on a larger scale than Fig. 1, showing a portion of one of the traction wheels and showing one of the traction lugs applied thereto;

Fig. 3 is a plan view of one of the traction lugs; and

Fig. 4 is a section taken on the line 4—4 of Fig. 3.

Of the parts of the tractor, it is only desirable for the purpose of this case to particularly note the body 5, rear traction wheels 6, and front wheels 7. The traction lugs are alike and, as indicated, are of figure 9 shape in plan and comprise substantially straight stem portions 8 and looped portions 9. Both the body and the loop-forming portions are flanged so that they are approximately L-shaped in cross section. The flange 10 extends along one edge of the straight portion 8 and follows the portion of the loop 9; the flange 11 extends from the flange 10 around a portion of the loop 9 and is joined to a flange 12. The several lugs are rigidly secured to the face of the traction wheel by bolts or rivets 13 in such relation that the flanges 12 of the several lugs are circumferentially aligned and form a continuous road-engaging bearing surface extending completely around the wheel. In a direction circumferentially of the wheel, the lugs are slightly concavo-convex so that they fit the face of the wheel and so that the outer portions of the flanges 10, 11 and 12 lie in the same imaginary cylindrical surface and hence will run smoothly on a hard road. When working in soft ground, the flanges of the lugs will, of course, settle into the earth and the earth or dirt can work through the loops and will fall from the loops, giving the wheel very great tractive engagement even with very soft ground.

In actual practice, the efficiency of these lugs designed as described and as herein claimed, has been thoroughly demonstrated. The lugs may be either forged or cast from any suitable metal, but would preferably be of cast steel or maleable iron.

What I claim is:

A traction wheel equipped with traction lugs, said lugs being of approximately figure 9 shape and comprising stem portions and loops, the stems being secured to the face of the wheel and the loops projecting outward therefrom and having portions of the loops of adjacent lugs in circumferentially aligned contact, the stem and loop portions of said lugs having outstanding flanges, certain of said flanges being extended circumferentially of the wheel and forming a continuous flange for supporting the wheel on hard roads.

JOSEPH GEARY,
Administrator for Gerhardt Geary, Deceased.